(12) United States Patent
Nozaki et al.

(10) Patent No.: US 6,892,804 B2
(45) Date of Patent: May 17, 2005

(54) HEAT EXCHANGER

(75) Inventors: Takahiro Nozaki, Anjo (JP); Yasutoshi Yamanaka, Kariya (JP); Hisashi Kobayashi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/102,576

(22) Filed: Mar. 20, 2002

(65) Prior Publication Data

US 2002/0134529 A1 Sep. 26, 2002

(30) Foreign Application Priority Data

Mar. 23, 2001 (JP) ........................................ 2001-085726

(51) Int. Cl.$^7$ ................................................. F28F 9/02
(52) U.S. Cl. ........................................ 165/173; 165/76
(58) Field of Search ......................... 165/149, 76, 173, 165/175

(56) References Cited

U.S. PATENT DOCUMENTS

| | | | | |
|---|---|---|---|---|
| 4,241,727 A | * | 12/1980 | Toti | 126/659 |
| 4,738,308 A | * | 4/1988 | Moranne | 165/149 |
| 5,226,490 A | * | 7/1993 | Ryan et al. | 165/173 |
| 5,346,003 A | * | 9/1994 | Halstead et al. | 165/173 |
| 6,000,461 A | * | 12/1999 | Ross et al. | 165/173 |

FOREIGN PATENT DOCUMENTS

| | | |
|---|---|---|
| EP | 0 962 739 | 12/1999 |
| GB | 1 370 860 | 10/1974 |
| GB | 1 401 671 | 7/1975 |
| JP | 6-22784 | 3/1994 |
| JP | 249491 | * 9/2000 |
| JP | 249492 | * 9/2000 |

OTHER PUBLICATIONS

Office Action dated Sep. 13, 2002 from Swedish Patent Appln. No. 0200840-7.

* cited by examiner

*Primary Examiner*—Leonard R. Leo
(74) *Attorney, Agent, or Firm*—Harness, Dickey & Pierce, PLC (57) ABSTRACT

The wall thickness of at least a portion, which is plastically deformed, of a protruding portion used for calking is reduced to less than that of the other portions. Due to the foregoing, the bending rigidity of the protruding portion is decreased. Therefore, it is possible to bend (plastically deform) the protruding portion by a relatively low-intensity force. Accordingly, it is possible to easily execute the calking work (calking process) without the need to extend the length of the protruding portion (length from a forward end of the protruding portion to a bent portion). As a result, even if the pressure-withstanding property of an inter-cooler is enhanced by increasing the wall thickness of core plates, it is possible to prevent the calking workability from deteriorating and without increasing the size of the inter-cooler.

3 Claims, 7 Drawing Sheets

HEAT EXCHANGER

BACKGROUND OF THE INVENTION

1. Field of the Invention

The present invention relates to a heat exchanger, and is effectively applied to an inter-cooler to cool air (suction air) used for combustion sucked into an internal combustion engine.

2. Description of the Related Art

Figure 1:
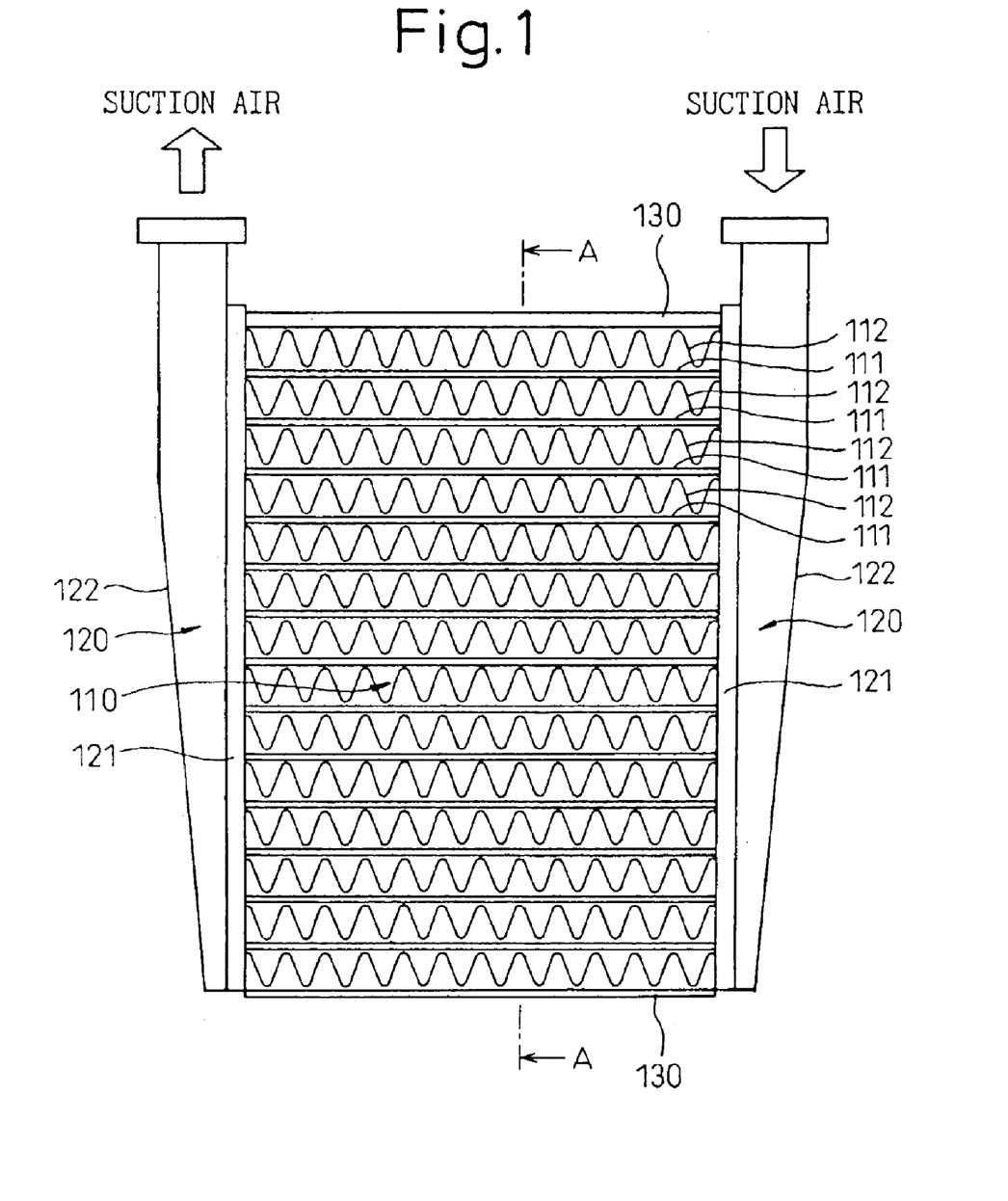
FIG. 1 is a front view of an inter-cooler of the first embodiment of the present invention.
Figure 6:
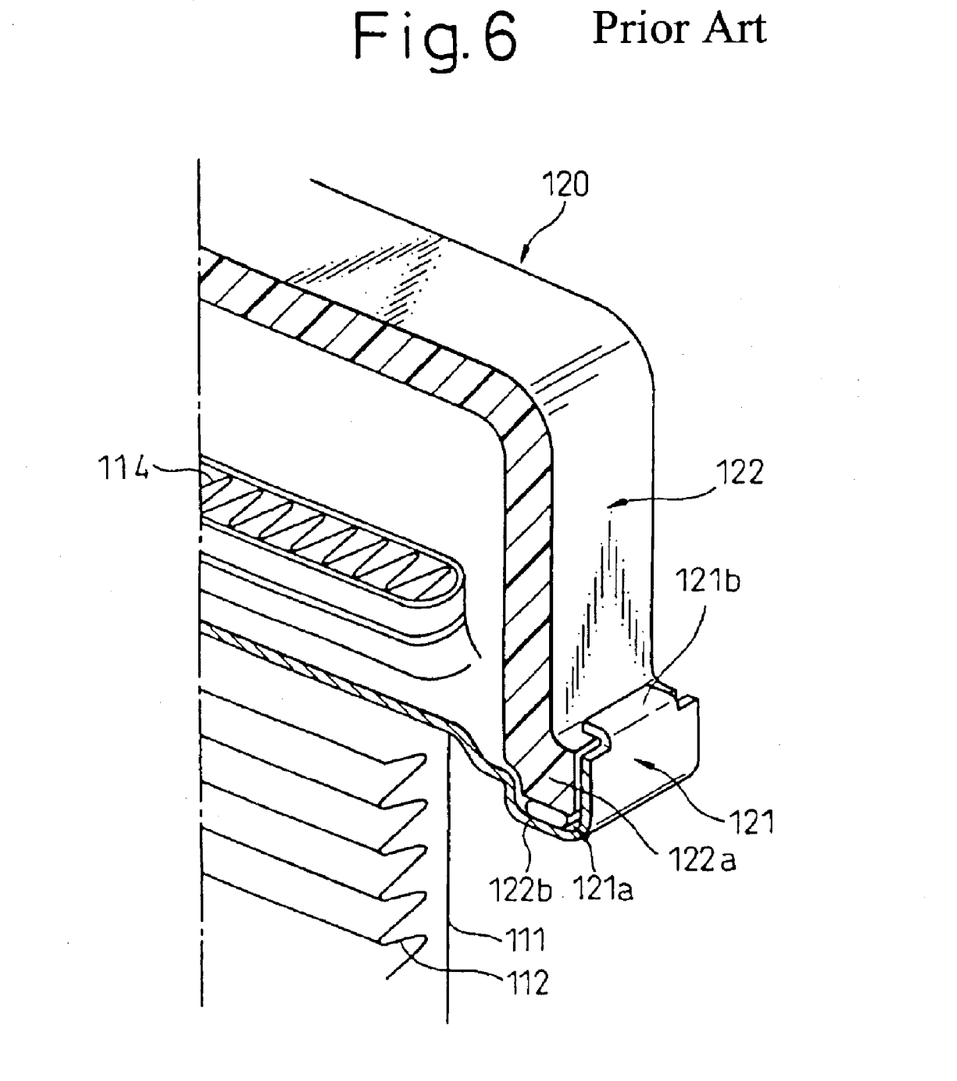
FIG. 6 is an enlarged perspective sectional view of a header tank portion of an inter-cooler made by way of trial production.

FIG. 1 is a front view showing an inter-cooler produced by way of trial and investigated by the present inventors. This inter-cooler includes: tubes 111 in which suction air flows; fins 112 for facilitating heat-exchange between cooling air and suction air; and header tanks 120 communicating with the tubes 111. As shown in FIG. 6, the header tanks 120 include: core plates 121 made of aluminum to which the tubes 111 are soldered; and a tank body 122 made of resin which constitutes a space in the tank being calked to the core plate 121.

Figure 7:
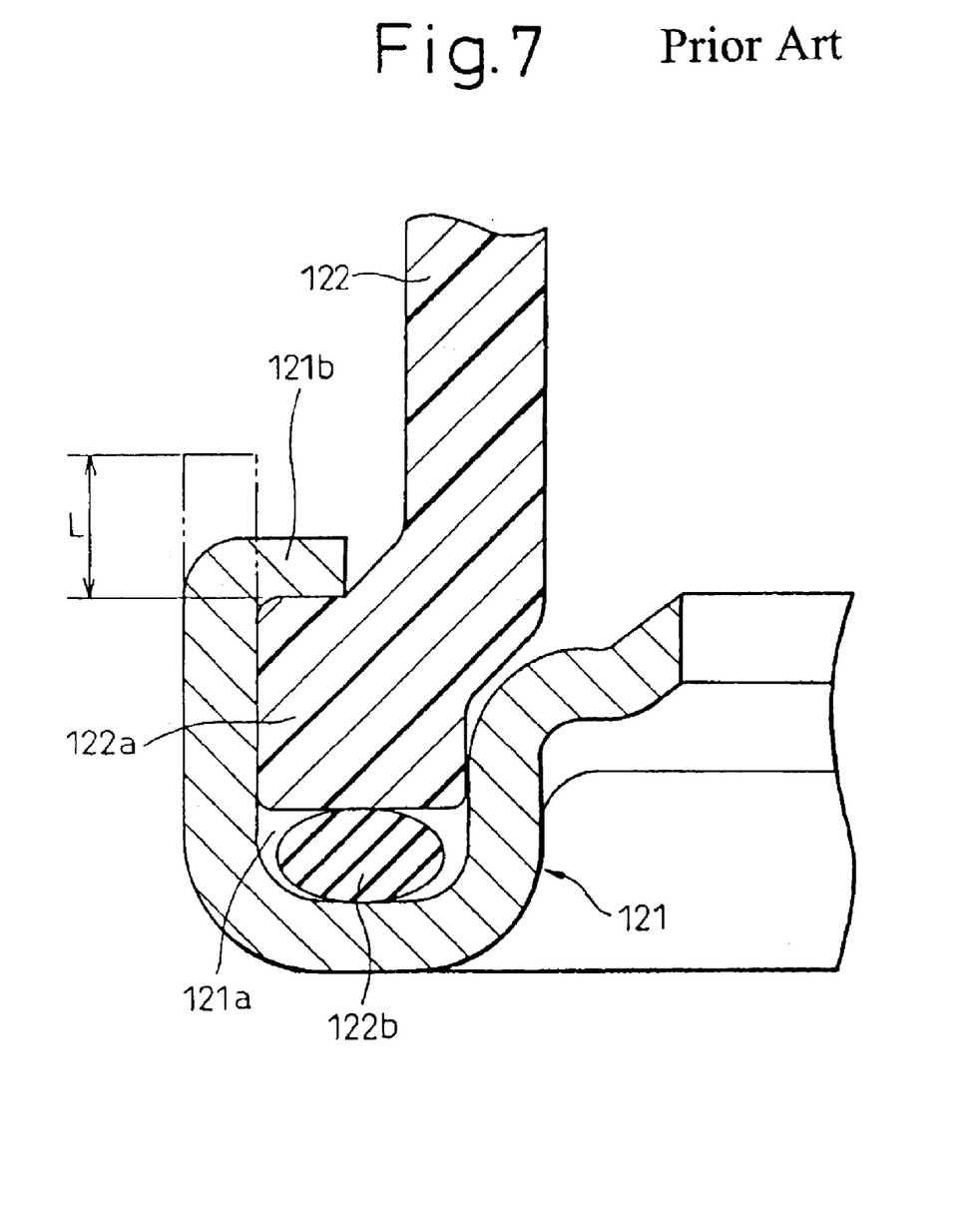
FIG. 7 is an enlarged sectional view of a header tank portion of an inter-cooler made by way of trial production.

In this inter-cooler produced by way of trial production, as shown in FIGS. 6 and 7, while the forward end portion 122a of the tank body 122 is being inserted into the groove portion 121a of the core plate 121, a forward end side of the protruding portion (pawl portion) 121b used for calking, which is provided on the core plate 121, is plastically deformed being bent onto the tank body 122 side, so that the tank body 122 and the core plate 121 are calked and fixed to each other.

In this connection, in order to enhance the pressure-withstanding strength of the inter-cooler, it is necessary to increase the wall thickness of parts such as the core plate 121 composing the inter-cooler. However, when the wall thickness of the core plate 121 is increased, the bending rigidity of the pawl portion 121b is increased. Accordingly, there is a possibility that the workability of the calking (bending work of bending the pawl portion 121b) will deteriorate.

On the other hand, when length L of the pawl portion 121b (length from the forward end of the pawl portion to the bent portion 121c) is extended, it is possible to generate a high bending moment in the bent portion by a relatively low-intensity force. Therefore, even if the wall thickness of the core plate 121 is large, it is possible to prevent the workability of the calking from deteriorating.

However, when the above means is adopted, length L of the pawl portion is extended. Therefore, width (thickness of the inter-cooler) W of the core plate 121 is increased, which degrades the mounting performance of the inter-cooler when the inter-cooler is mounted on a vehicle.

SUMMARY OF THE INVENTION

The present invention has been accomplished to solve the above problems. It is an object of the present invention to provide a heat exchanger such as an inter-cooler, the workability of the calking of which is prevented from deteriorating while obviating the need to increase the size of the heat exchanger.

In order to accomplish the above object, according to the first aspect of the present invention, there is provided a heat exchanger comprising: a plurality of tubes (111) in which fluid flows; fins (112) joined to outer surfaces of the tubes (111), for facilitating heat-exchange between fluid flowing round the tubes (111) and fluid flowing in the tubes (111); header tanks (120) arranged at end portions of the tubes (111) in the longitudinal direction, extending in a direction perpendicular to the longitudinal direction of the tubes (111) and communicating with the plurality of tubes (111), the header tanks (120) including core plates (121) to which the tubes (111) are joined, the header tanks (120) also including tank bodies (122) calked and fixed to the core plates (121) by plastically deforming calking portions (121b) provided on the core plates (121), wherein the wall thickness of at least portion (T) to be plastically deformed in the calking portion (121b) is less than that of the other portions.

Due to the foregoing, the bending rigidity of the calking portion (121b) is decreased. Therefore, it is possible to bend (plastically deform) the calking portion (121b) by a relatively low-intensity force.

Accordingly, it is possible to easily execute the calking work (calking process) without extending the length of the calking portion (121b). Even if the wall thickness of the core plate (121) is increased so as to enhance its pressure-withstanding property, the workability of the calking can be prevented from deteriorating while obviating the need to increase the size of the heat exchanger.

According to the second aspect of the present invention, there is provided a heat exchanger comprising: a plurality of tubes (111) in which fluid flows; fins (112) joined to outer surfaces of the tubes (111), for facilitating heat-exchange between fluid flowing round the tubes (111) and fluid flowing in the tubes (111); header tanks (120) arranged at end portions of the tubes (111) in the longitudinal direction, extending in a direction perpendicular to the longitudinal direction of the tubes (111) and communicating with the plurality of tubes (111), the header tanks (120) including core plates (121) to which the tubes (111) are joined, the header tanks (120) also including tank bodies (122) calked and fixed to the core plates (121) by plastically deforming calking portions (121b) provided on the core plates (121), wherein the wall thickness of at least portion (T) to be plastically deformed on the forward end side of the calking portion (121b) is less than that of the other portions.

Due to the foregoing, the bending rigidity of the calking portion (121b) can be reduced. Therefore, it is possible to bend (plastically deform) the calking portion (121b) with a relatively low-intensity force.

Accordingly, it is possible to easily execute the calking work (calking process) without the need to extend the length of the calking portion (121b). Therefore, even if the wall thickness of the core plate (121) is increased so as to enhance the pressure-withstanding property of the heat exchanger, it is possible to prevent deterioration of the workability of the calking, and obviate the need to increase the size of the heat exchanger.

According to the third aspect of the present invention, an inter-cooler for cooling combustion air sucked into an internal combustion engine, comprises: a plurality of tubes (111) in which combustion air flows; fins (112) joined to outer surfaces of the tubes (111), for facilitating heat-exchange between cooling air flowing round the tubes (111) and combustion air flowing in the tubes (111); header tanks (120) arranged at end portions of the tubes (111) in the longitudinal direction, extending in a direction perpendicular to the longitudinal direction of the tubes (111) and communicating with the plurality of tubes (111), the header tanks (120) including core plates (121) to which the tubes (111) are joined, the header tanks (120) also including tank bodies (122) calked and fixed to the core plates (121) by plastically deforming calking portions (121b) provided on the core plates (121), wherein the wall thickness of at least portion (T) to be plastically deformed on the forward end side of the calking portion (121b) is less than that of the other portions.

Due to the foregoing, the bending rigidity of the calking portion (121b) can be reduced. Therefore, it is possible to bend (plastically deform) the calking portion (121b) with a relatively low-intensity force.

Accordingly, it is possible to easily execute the calking work (calking process) without the need to extend the length of the calking portion (121b). Therefore, even if the wall thickness of the core plate (121) is increased so as to enhance the withstanding pressure property of the inter-cooler, it is possible to prevent deterioration of the working property of calking, and obviate the need to increase the size of the inter-cooler.

In this connection, reference numerals in parentheses of the means described above correspond to specific means in the embodiment which will be described later.

The present invention may be more fully understood from the description of preferred embodiments of the invention set forth below, together with the accompanying drawings.

DESCRIPTION OF THE PREFERRED EMBODIMENTS

First of all, the first embodiment of the present invention will be explained below. In this embodiment, the heat exchanger of the present invention is applied to an inter-cooler for vehicle use. FIG. 1 is a front view of an inter-cooler of the embodiment of the present invention.

In FIG. 1, reference numeral 111 is a flat tube made of aluminum in which suction air flows. Reference numeral 112 is a wave-shaped outer fin made of aluminum, which is joined onto a flat face of the tube 111, for facilitating heat exchange between cooling air, which flows round the tube 111, and suction air. These outer fin 112 and tube 111 compose a substantially rectangular cooling core portion 110, which will be referred to as a core hereinafter, for cooling suction air.

Figure 2:
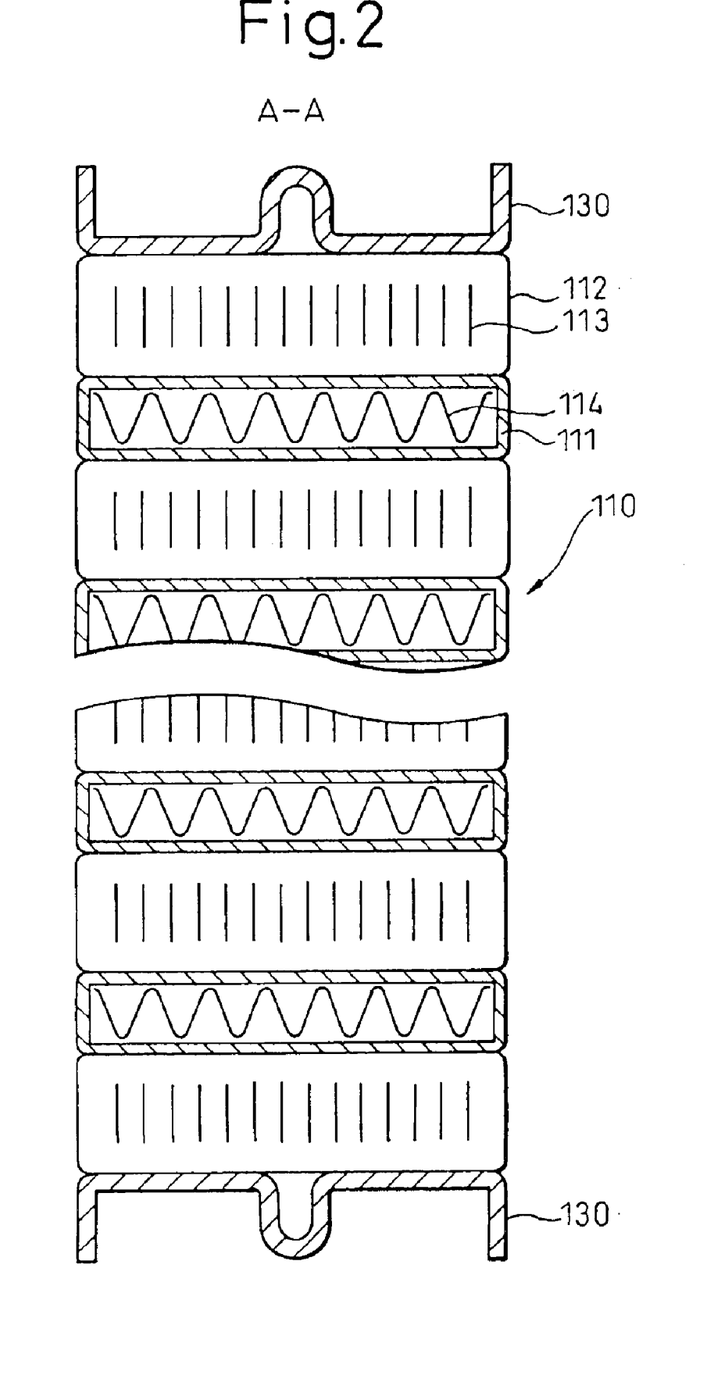
FIG. 2 is a sectional view taken on line A—A in FIG. 1.

In this connection, as shown in FIG. 2, the outer fin 112 is provided with louvers 113 for disturbing a current of air so as to prevent a temperature boundary layer from growing. In this case, the louvers 113 are formed when a portion of the outer fin 112 is cut and raised up. On the other hand, in the tube 111, there is provided an inner fin 114, the structure of which is the same as that of the outer fin.

The tube 111 is made in such a manner that a sheet, on the front and rear surfaces of which solder (A4045 or A4343 in this embodiment) is clad, is bent and electrically welded, i.e. the tube 111 is a seam welded pipe. The outer fin 112 and the inner fin 114 are soldered to the tube 111 by solder which is clad on the tube 111.

Figure 3:
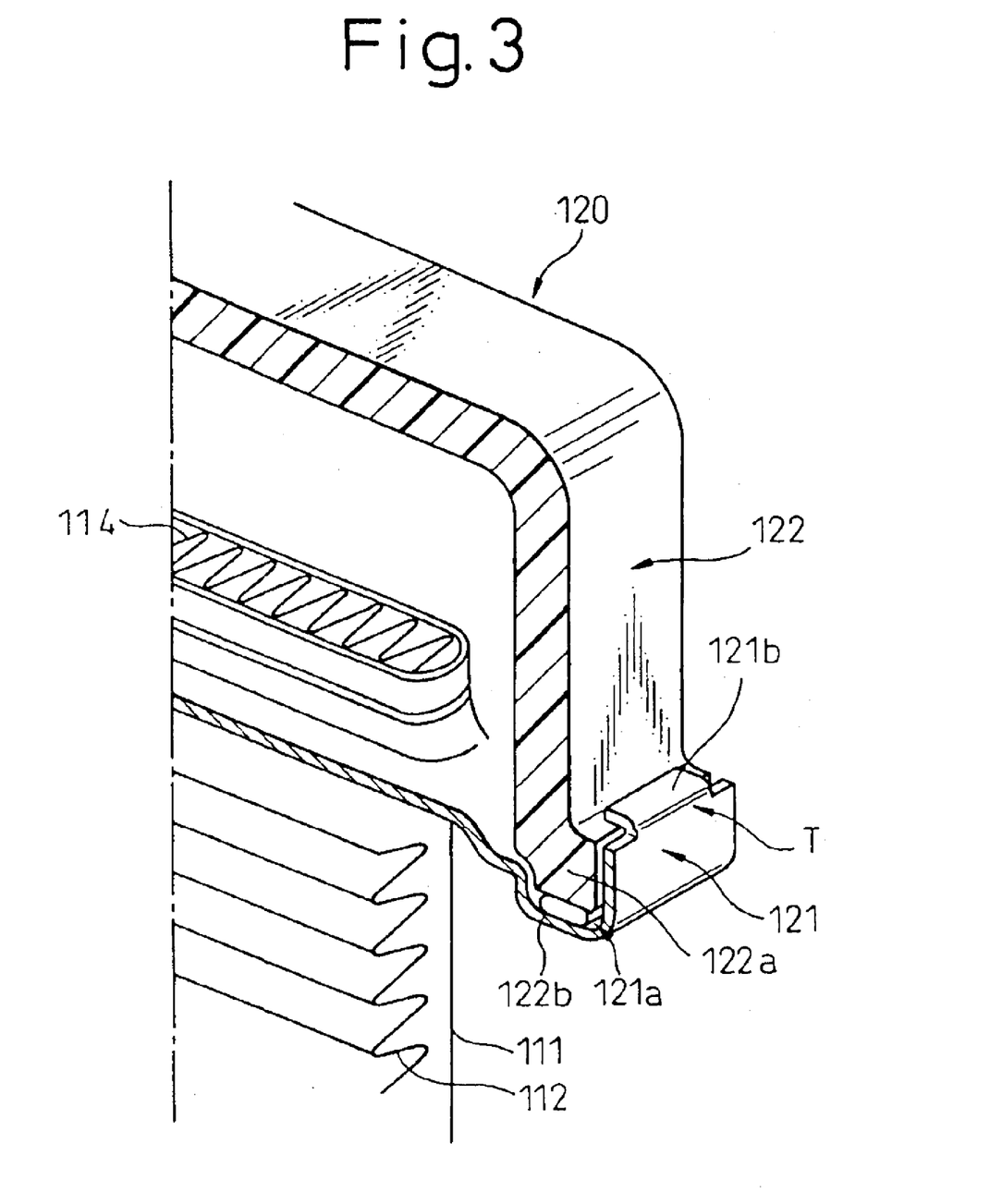
FIG. 3 is an enlarged perspective sectional view of a header tank portion of an inter-cooler of the first embodiment of the present invention.

As shown in FIG. 1, on both ends of the tube 111 in the longitudinal direction, there are provided header tanks 120 which extend in a direction perpendicular to the longitudinal direction of the tube 111 and communicate with each tube 111. As shown in FIG. 3, the header tanks 120 include: core plates 121 made of aluminum to which the tubes 111 are soldered; and tank bodies 122 made of resin which are calked to the core plates 121 and constitute a space in the tank.

Figure 4:
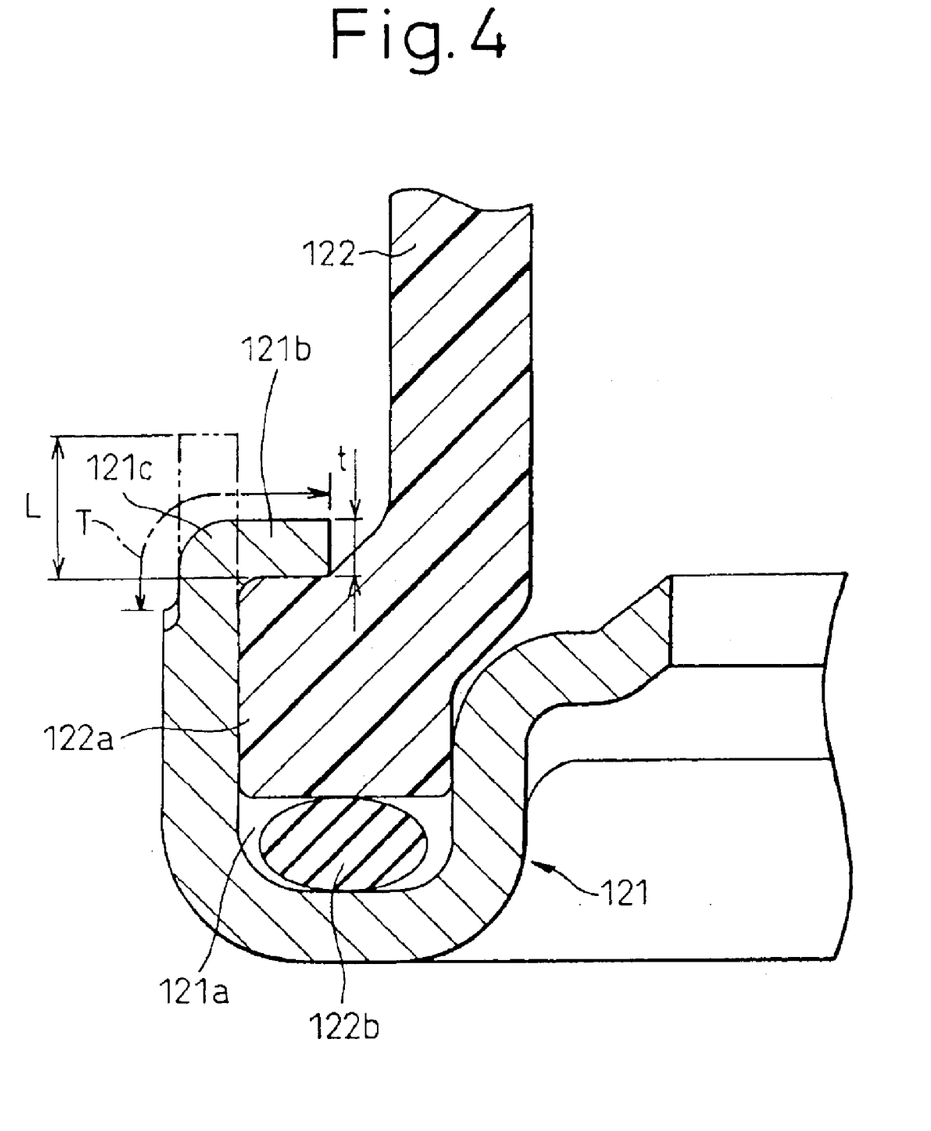
FIG. 4 is an enlarged sectional view of a header tank portion of an inter-cooler of the first embodiment of the present invention.

Specifically, as shown in FIGS. 3 and 4, while a forward end portion (skirt portion) of the tank body 122 is being inserted into the groove portion 121a of the core plate 121, a forward end side of the protruding portion (pawl portion, calking portion) for calking provided on the core plate 121 is bent (plastically deformed) to the tank body 122 side so that the forward end side of the protruding portion can be bent from a state shown by the two-dotted chain line to a state shown by the solid line in the drawing. In this way, the tank body 122 and the core plate 121 are calked and fixed to each other.

In this case, wall thickness t of a portion on the forward end side of the protruding portion 121b which is at least plastically deformed, that is, wall thickness t of a portion (T), which is shown by the bold two-dotted chain line in FIG. 4 in this embodiment, is reduced to less than the wall thickness of the other portions by press forming.

In this connection, in a bottom portion of the groove portion 121a, there is provided a packing member 122b made of elastic material such as rubber which comes into contact with the skirt portion 122a and tightly closes a gap between the tank body 122 and the core plate 121.

The tube 111 is soldered to the core plate 121 by solder material which is clad on both the front and the rear face of the core plate 121.

As shown in FIG. 2, in a portion of the end portion of the core 110 in which the header tank 120 is not provided, there is provided an insert (reinforcing plate) 130 made of aluminum which extends substantially in parallel with the tube 111 and reinforces the core portion 110. A face of this insert 130, which is located on the core section 110 side, is soldered to the outer fin 112, and both end portions of this insert 130 in the longitudinal direction are soldered to the header tank 120 (core plate 121).

In this connection, solder is clad at least on the face of the insert 130 on the outer fin 112 side. In this embodiment, the insert 130 and the outer fin 112 are soldered to each other by solder material clad on the insert 130, and the insert 130 and the core plate 121 are soldered to each other by solder material clad on the core plate 121.

Next, an outline of the method of manufacturing the inter-cooler 100 will be explained below.

The tubes 111, fins 112 and inserts 130 are placed horizontally on a working table such as a surface plate. Then, the cores 110 are laminated and assembled as shown in FIG. 1 (core assembling process).

Next, the core plates 121 are mounted on the cores 110 (including the inserts 130). After that, while the assembling state is being maintained by a jig such as a wire, the assembled components are set in a furnace so that the width direction W (direction perpendicular to the longitudinal direction) of the insert 130 corresponds to the vertical direction. Then, the assembled components are heated and soldered in the furnace (soldering process).

After completion of the soldering process, the tank body 122 is calked and fixed to the core plate 121 (calking process). Then, the assembled components are subjected to a predetermined inspection such as a leakage inspection (inspection for checking for the occurrence of defective soldering and defective calking) and a dimensional inspection. In this way, the inter-cooler is manufactured.

Next, the characteristic (operation and effect) of this embodiment will be described below.

According to this embodiment, wall thickness t of a portion of the protruding portion 121b which is at least plastically deformed, i.e. wall thickness t of a portion (T), which is shown by the bold two-dotted chain line in FIG. 4 in this embodiment, is reduced to less than the wall thickness of the other portions. Therefore, the bending rigidity of the protruding portion 121b is decreased, and it becomes possible to bend (plastically deform) the protruding portion 121b by a relatively low-intensity force.

Accordingly, calking work (the calking process) can be easily executed without extending length L of the protruding portion 121b (length from the forward end of the protruding portion 121b to the bent portion 121c).

Even if the withstanding pressure property of the inter-cooler 100 is enhanced by increasing the wall thickness of the core plate 121, it is possible to prevent deterioration of the calking workability, and obviate the need to increase the size of the inter-cooler 100.

Figure 5:
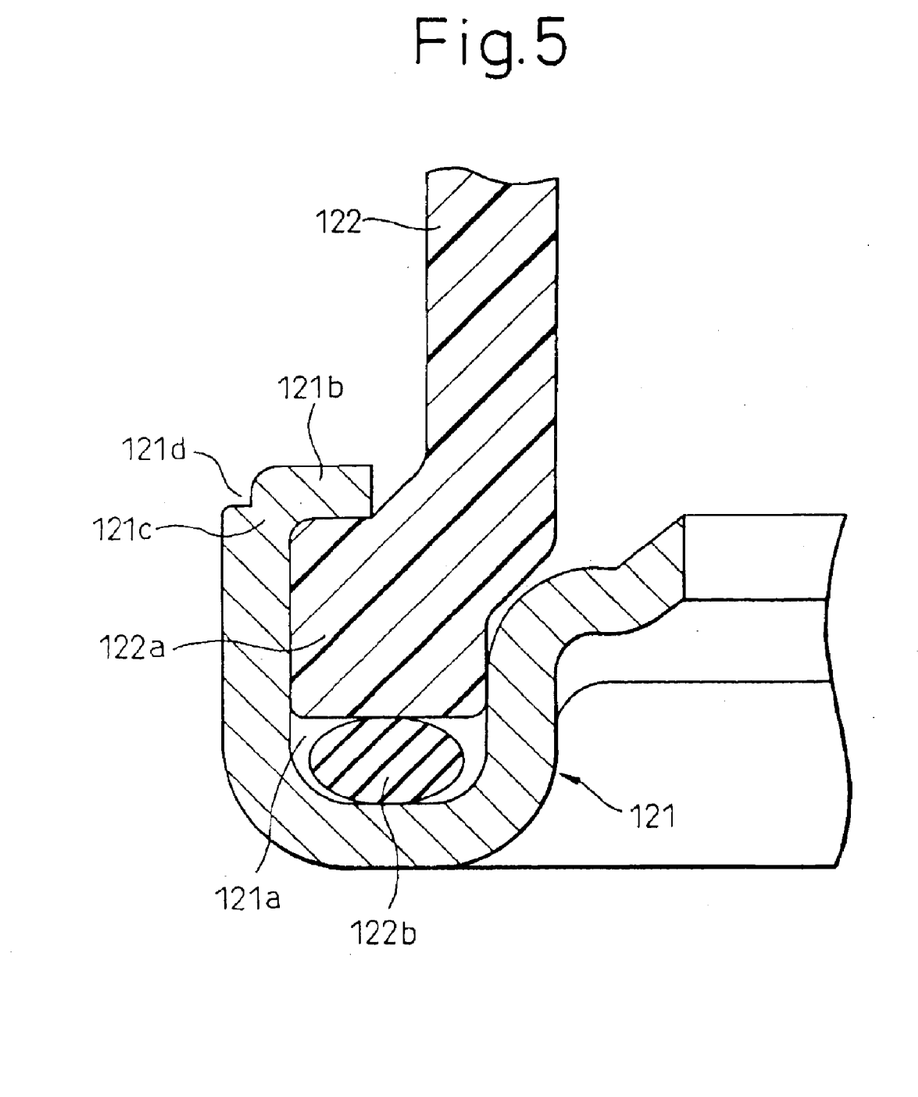
FIG. 5 is an enlarged sectional view of a header tank portion of an inter-cooler of the second embodiment of the present invention.

Next, the second embodiment will be explained below. In the first embodiment, as a portion, the wall thickness of which is reduced, i.e. as a portion of the protruding portion 121b which is at least plastically deformed, the wall thickness of all regions from the bent portion 121c to the forward end of the protruding portion 121b is reduced to less than the wall thickness of the other portions. However, a portion, which is actually plastically deformed, is the bent portion 121c. Therefore, in this embodiment, as shown in FIG. 5, the groove portion 121d, is provided so that the wall thickness of the bent portion 121c is reduced by the groove portion 121d.

In this connection, the groove portion 121d may be provided on either the front face or the reverse face of the protruding portion 121b.

Next, another embodiment will be explained as follows. In the above embodiment, the present invention is applied to an inter-cooler. However, the present invention is not limited to the above specific embodiment. It is possible to apply the present invention to another heat exchanger, such as a condenser or radiator.

In the above embodiment, a plurality of protruding portions 121b are provided separate from each other in the longitudinal direction of the core plate 121. However, the present invention is not limited to the above specific embodiment. The protruding portion 121b may be formed in a belt-shape which is continuously connected in the longitudinal direction of the core plate 121.

While the invention has been described by reference to specific embodiments chosen for purposes of illustration, it should be apparent that numerous modifications could be made thereto by those skilled in the art without departing from the basic concept and scope of the invention.

What is claimed is:

1. A heat exchanger comprising:
   a plurality of tubes in which fluid flows;
   fins joined to outer surfaces of the tubes for facilitating heat-exchange between fluid flowing round the tubes and fluid flowing in the tubes;
   header tanks arranged at end portions of the tubes extending in a direction perpendicular to a longitudinal direction of the tubes and communicating with the plurality of tubes;
   the header tanks including core plates to which the tubes are joined, the header tanks also including tank bodies caulked and fixed to the core plates by plastically deforming caulking portions provided on the core plates, wherein:
   an outer portion to be plastically deformed on an end of the caulking portion has a reduced wall thickness that is less than that of the other portions of the caulking portion;
   the outer end having the reduced wall thickness extends from the end of the caulking portion to a position beyond a bent portion of the caulking portion;
   a stepless internal surface of the caulking portion is disposed on the tank side;
   a stepped outer surface of the caulking portion is disposed on a side opposite to the tank side to form the reduced wall thickness of the outer portion; and
   the bent portion is disposed in the reduced wall thickness of the outer portion.

2. An inter-cooler for cooling combustion air sucked into an internal combustion engine, comprising:
   a plurality of tubes in which combustion air flows;
   fins joined to outer surfaces of the tubes for facilitating heat-exchange between cooling air flowing round the tubes and combustion air flowing in the tubes;
   header tanks arranged at end portions of the tubes extending in a direction perpendicular to a longitudinal direction of the tubes and communicating with the plurality of tubes;
   the header tanks including core plates to which the tubes are joined, the header tanks also including tank bodies caulked and fixed to the core plates by plastically deforming caulking portions provided on the core plates, wherein:
   an outer portion to be plastically deformed on an end of the caulking portion has a reduced wall thickness that is less than that of the other portions of the caulking portion;
   the outer end having the reduced wall thickness extends from the end of the caulking portion to a position beyond a bent portion of the caulking portion;
   a stepless internal surface of the caulking portion is disposed on the tank side;
   a stepped outer surface of the caulking portion is disposed on a side opposite to the tank side to form the reduced wall thickness of the outer portion; and
   the bent portion is disposed in the reduced wall thickness of the outer portion.

3. A heat exchanger comprising:
   a plurality of tubes;
   fins joined to outer surfaces of the tubes;
   header tanks arranged at end portions of the tubes, the header tanks extending in a direction perpendicular to a longitudinal direction of the tubes;
   the header tanks including core plates to which the tubes are joined and tank bodies caulked and fixed to the core plates by plastically deforming caulking portions provided on the core plates;

a wall thickness of an outer portion of the caulking portion being less than a wall thickness of the core plate, the outer portion extending to an end of the core plate, a length of the outer portion being greater than a length of the caulking portion extending from a bent portion of the outer portion to the end of the core plate, the caulking portions having a non-stepped surface disposed on a side facing the core plate and a stepped surface disposed on a side opposite to the core plate; and the bent portion is disposed within the outer portion of the caulking portion.

* * * * *

UNITED STATES PATENT AND TRADEMARK OFFICE
CERTIFICATE OF CORRECTION

PATENT NO.    : 6,892,804 B2
DATED         : May 17, 2005
INVENTOR(S)   : Takahiro Nozaki et al.

It is certified that error appears in the above-identified patent and that said Letters Patent is hereby corrected as shown below:

Column 6,
Lines 2 and 33, "round" should be -- around --.

Signed and Sealed this

Thirtieth Day of August, 2005

JON W. DUDAS
*Director of the United States Patent and Trademark Office*